Feb. 22, 1966  D. S. CHISHOLM  3,235,881
PLASTIC GLOVE
Filed Oct. 4, 1963

INVENTOR.
Douglas S. Chisholm
BY
Robert B. Ingraham
AGENT 3,235,881
PLASTIC GLOVE
Douglas S. Chisholm, Midland, Mich., assignor to The Dow Chemical Company, Midland, Mich., a corporation of Delaware
Filed Oct. 4, 1963, Ser. No. 313,953
1 Claim. (Cl. 2—167)

This invention relates to plastic gloves. It more particularly relates to thermoplastic resinous gloves having surface ribbing.

Commonly, thermoplastic resinous gloves are prepared by sealing together two layers of a thermoplastic resinous film to form a glove shaped article being symmetrical on both sides. Generally this is accomplished by using a heated die which is placed on the surface of the two layers of film and simultaneously cutting and sealing the sheet together about the desired periphery. One portion of the glove is left unsealed for the insertion of the hand. Such gloves have some undesirable features in that the wearer is uncomfortably aware of differences in temperature such as when gripping warm objects or extremely cold objects. Inherently the surfaces of such gloves are usually smooth and oftentimes slippery objects are dropped because of the smooth surfaces. Oftentimes the smooth surfaces cause considerable discomfort to the wearer, particularly when the wearer's hands perspire and the inside of the gloves become moist. The adhesion of the gloves to the hands of the wearer frequently can be inconvenient as well as uncomfortable.

Therefore it is an object of this invention to provide an improved plastic glove.

It is another object of this invention to provide a plastic glove with an improved gripping surface.

It is a further object of the invention to provide a plastic glove having improved thermal insulating properties.

These benefits and other advantages in accordance with the invention are readily achieved by providing a glove comprising opposed portions of flexible thermoplastic resinous film sealed to each other about at least a portion of the edges thereof in a manner to provide an opening for the insertion of a hand, the improvement which comprises providing a plurality of ribs in closely spaced relationship to each other on at least the inner surface of the glove.

Further features and advantages of the invention will become more apparent from the drawing wherein.

Figure 1:
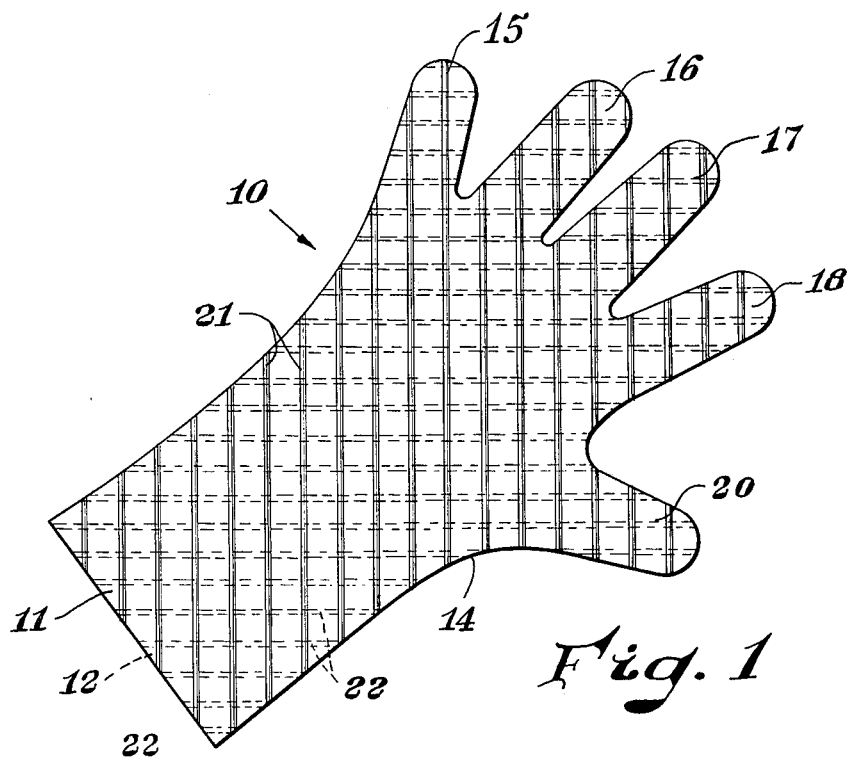
FIGURE 1 depicts a view of a glove in accordance with the invention.

In FIGURE 1 there is illustrated a glove generally designated by the reference numeral 10. The glove 10 comprises a sheet 11 and a sheet 12. The sheets 11 and 12 are heat sealed together about their periphery 14. The sheets 11 and 12 and the periphery 14 define the finger portions 15, 16, 17 and 18 and the thumb 20. The outer surfaces of the sheets 11 and 12 are provided with a plurality of ribs 21 and the inner surfaces with a plurality of ribs 22.

Figure 2:
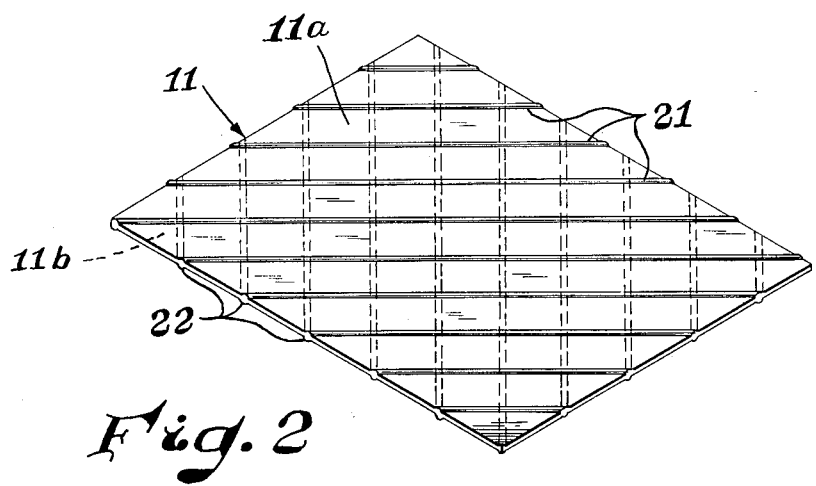
FIGURE 2 is an enlarged portion of the glove of FIGURE 1.

In FIGURE 2 there is illustrated a fragmentary portion of the sheet 11 and the glove 10. The sheet 11 is provided with an outer surface 11A and an inner surface 11B. Affixed to the surface 11A of the sheet 11 are a plurality of ribs 21 and on the surface 11B are a plurality of ribs 22. The ribs 21 and 22 are disposed in angular relationship to each other.

Gloves in accordance with the present invention are readily prepared from a wide variety of thermoplastic resinous sheet material. Any flexible sealable thermoplastic resinous material may be utilized for the production of gloves, such as polyvinyl chloride, polyethylene, polypropylene, resinous copolymers of ethylene and propylene, polyamide polymers such as are generally sold as nylon, such as the condensation product of about 1 mole of adipic acid with 1 mole of hexamethylenediamine. Also suitable for the preparation of such gloves are the sarans which generally are copolymers of vinylidene chloride with vinyl chloride or vinylidene chloride with acrylonitrile or alternately vinylidene chloride with ethyl acrylate.

Gloves in accordance with the invention may be prepared by known methods of glove formation which comprises placing two sheets of film in face to face relationship, simultaneously severing the glove from the parent sheet by means of a sealing and cutting die, the sealing and cutting die sealing and cutting the periphery of the glove with the exception of the cuff portion wherein it is only cut. Suitable film or sheet for the preparation of such gloves are readily prepared by extrusion in the manner described in British Patent 936,556, which relates to the extrusion of a thermoplastic web having integral ribs formed on the surface thereof. Generally for the preparation of gloves in accordance with the invention, it is desirable to provide ribs which are spaced on about $\frac{1}{8}$ inch centers and generally not closer than on about $\frac{1}{32}$ of an inch centers. Generally it is desirable that the rib width should not be greater than the height of the rib. If the height of the rib exceeds the rib width, some tendency is observed for the rib to fold and partially lose the benefits achieved by providing the relatively rigid rib. In general, however, the ratio of rib height to rib width should not fall below about 1:10. Beneficially the width of the rib should be no greater than about one-half the space between centers on the ribs and in general the ribs should have a width of about $\frac{1}{10}$ of the center to center rib spacing. Thus gloves prepared in accordance with the present invention provide a surface that is generally maintained in spaced relationship from the user's hands and also from the object being gripped. As the ribs on the opposite surfaces of the sheet forming the gloves are disposed in angular relationship the skin is separated from the object being gripped by a space defined by the inner surface of the glove, the finger and the ribs and a space defined by the outer surface of the glove, the ribs and the object being gripped. The absence of a smooth inner surface and the fact that ribs are employed provides improved air circulation within the gloves and there is much less tendency for such gloves to adhere to the moistened hands of the user. Thus when the wearer of a pair of gloves in accordance with the invention perspires, the gloves do not adhere to the fingers and hands and the addition of talcum powder to the inner surface of the gloves is substantially unnecessary. Further, gloves in accordance with the invention are inexpensive, disposable, and will fit on either hand. For the wearer's comfort it is usually desirable to provide a rib having a generally arcuate cross sectional configuration for the inner surface of the glove whereas oftentimes a rectangular configuration is more suited for the exterior. Advantageously the external ribs of the surface of the glove provide a nonslip surface as well as additional thermal insulation for the wearer's hand.

As is apparent from the foregoing specification, the glove of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claim.

What is claimed is:

A glove comprising opposed portions of flexible thermoplastic resinous film sealed to each other about at least a portion of the edges thereof in a manner to provide an opening for the insertion of a hand, the improvement which comprises providing a plurality of ribs in closely spaced relationship to each other on the outer surface and the inner surface of the glove wherein the ribs of the inner surface are disposed in angular relationship to the ribs on the outer surface, the ribs being spaced from one another in center to center relationship from about 1/32 of an inch to about 1/8 of an inch, and the rib width is from about 1 to 10 times the height of the rib.

References Cited by the Examiner

UNITED STATES PATENTS

| | | | |
|---|---|---|---|
| 2,670,473 | 3/1954 | Stebic | 2—159 |
| 2,847,676 | 8/1958 | Scott | 2—159 |
| 3,094,704 | 6/1963 | Abildgaard | 2—167 |

FOREIGN PATENTS

| | | |
|---|---|---|
| 479,502 | 4/1916 | France. |
| 1,201,657 | 1/1960 | France. |
| 836,555 | 6/1960 | Great Britain. |
| 836,556 | 6/1960 | Great Britain. |

JORDAN FRANKLIN, *Primary Examiner.*